United States Patent
Sheng (10) Patent No.: US 12,354,102 B2
(45) Date of Patent: Jul. 8, 2025

(54) SECURE AND CONVENIENT DOCUMENT PAYMENT PROCESSING DEVICE AND SYSTEM

(71) Applicant: AVISION INC., Hsinchu (TW)

(72) Inventor: Shih-Chao Sheng, Hsinchu (TW)

( * ) Notice: Subject to any disclaimer, the term of this patent is extended or adjusted under 35 U.S.C. 154(b) by 0 days.

(21) Appl. No.: 17/408,508

(22) Filed: Aug. 23, 2021

(65) Prior Publication Data

US 2022/0084030 A1    Mar. 17, 2022

(30) Foreign Application Priority Data

Sep. 11, 2020   (TW) ................. 109131403

(51) Int. Cl.
*G06Q 20/40* (2012.01)
*G06F 3/12* (2006.01)
(Continued)

(52) U.S. Cl.
CPC ....... *G06Q 20/4014* (2013.01); *G06F 21/608* (2013.01); *G06Q 20/085* (2013.01); *G06Q 20/322* (2013.01); *G06Q 20/3821* (2013.01); *G06Q 20/409* (2013.01); *G06F 3/1285* (2013.01); *G07F 17/266* (2013.01)

(58) Field of Classification Search
CPC ............ G06Q 20/4014; G06Q 20/085; G06Q 20/322; G06Q 20/3821; G06Q 20/409; G06F 21/608; G06F 3/1285; G07F 17/266
See application file for complete search history.

(56) References Cited

U.S. PATENT DOCUMENTS

2002/0150243 A1 * 10/2002 Craft .................. H04L 63/0823
                                                        713/168
2003/0101342 A1 *  5/2003 Hansen ................. G06F 21/35
                                                        713/167
(Continued)

FOREIGN PATENT DOCUMENTS

CN      107797779 A  *  3/2018
CN      110837349 A  *  2/2020

OTHER PUBLICATIONS

WeChat print function so magical Don't leave home to solve a family problem, Feb. 12, 2020, China IT News, https://fonow.com/view/249368.html (Year: 2020).*

*Primary Examiner* — John W Hayes
*Assistant Examiner* — Taylor S Rak (57) ABSTRACT

A secure and convenient document payment processing device and system are provided. A user's document payment processing device is connected to a remote end and a document processing device via a network. A document to be printed out is uploaded to the remote end with a link program provided by a trusted proxy app installed on the document payment processing device. A mobile payment program is executed according to a fee information provided by the remote end. Upon completion of payment, the document payment processing device sends a document output command to the remote end, enabling the remote end to send the document to be printed out to the document processing device for output. Use of secure apps protects personal information. Operation procedures are streamlined to enhance operation efficiency. Fee collection is improved to enhance payment management efficiency.

12 Claims, 4 Drawing Sheets

(51) Int. Cl.
*G06F 21/60* (2013.01)
*G06Q 20/08* (2012.01)
*G06Q 20/32* (2012.01)
*G06Q 20/38* (2012.01)
*G07F 17/26* (2006.01)

(56) References Cited

U.S. PATENT DOCUMENTS

| | | | |
|---|---|---|---|
| 2005/0053402 A1* | 3/2005 | Ishii | G06F 3/1207 400/62 |
| 2007/0268518 A1* | 11/2007 | Yokoyama | G06F 21/608 358/1.15 |
| 2009/0100425 A1* | 4/2009 | Russell | H04L 67/01 718/1 |
| 2011/0096354 A1* | 4/2011 | Liu | G06F 3/1292 358/1.15 |

* cited by examiner

SECURE AND CONVENIENT DOCUMENT PAYMENT PROCESSING DEVICE AND SYSTEM

CROSS-REFERENCE TO RELATED APPLICATION

This non-provisional application claims priority under 35 U.S.C. § 119(a) on Patent Application No(s). 109131403 filed in Taiwan, R.O.C. on Sep. 11, 2020, the entire contents of which are hereby incorporated by reference.

BACKGROUND OF THE INVENTION

1. Field of the Invention

The present disclosure relates to processing device and systems, and in particular to a secure and convenient document payment processing device and system.

2. Description of the Related Art

The rapid, widespread emergence of convenience stores, their long operation hour, and their handy consumer-oriented services together bring changes to people's lifestyles, including placing goods mailing orders, collecting purchased goods, paying utility fees, printing pictures, printing documents, and the like at convenience stores.

In general, convenience stores have multimedia information devices (for example, ibon, FamiPort) whereby users verify related information and receipts about the aforesaid consumer services, print documents and print pictures.

For example, to print documents, the users connect their mobile devices to a network to download an app corresponding to the multimedia information devices, use the app to upload the documents to a cloud server corresponding to the multimedia information device, and then undergo user identity authentication and document confirmation with the multimedia information devices or mobile devices. After that, the multimedia information devices print out the documents and bills. Finally, the users pay the bills at the counters of the convenience stores.

As mentioned before, the users undergo identity authentication and document confirmation with the multimedia information devices, allowing the multimedia information devices to print out the documents and bills.

The prior art has drawbacks. First, the users have to use their own mobile devices to download an app at their own risk, predisposing personal information stored in the mobile devices to theft and tampering. Second, it takes the users much time operating the multimedia information devices. Third, the multimedia information devices each print out a document and a bill simultaneously, providing an opportunity for dishonest users to take their documents without making payment.

BRIEF SUMMARY OF THE INVENTION

An objective of the present disclosure is to provide a secure and convenient document payment processing device and system. The document payment processing device uploads a document with a secure app. Upon completion of mobile payment, a user takes the document printed out. Therefore, the secure and convenient document payment processing device and system protect personal information, improve operation processes, and improve fee collection processes, so as to enhance security, operation efficiency and payment management efficiency.

To achieve at least the above objective, the present disclosure provides a secure and convenient document payment processing device is connected to a remote end and a document processing device via a network. The document payment processing device comprises:

a storage module for storing a document to be printed out;
a display module for displaying the document to be printed out or related data;
a communication module connected to the remote end and the document processing device via the network to do a data exchange; and
a processing module connected to the storage module, the display module, the communication module,
wherein a trusted proxy app is installed on and executed by the processing module, such that the trusted proxy app provides a link program, and the document to be printed out is uploaded by the processing module to the remote end via the communication module, using a link program provided by the trusted proxy app, and then the processing module executes a mobile payment program according to a fee information provided by the remote end, wherein, upon completion of payment, the processing module sends a document output command to the remote end via the communication module to instruct the remote end to send the document to be printed out to the document processing device for output.

To achieve at least the above objective, the present disclosure provides a secure and convenient document payment processing system, comprising:

a document processing device for outputting a document;
a cloud server system located at a remote end and connected to the document processing device via a network; and
a document payment processing device connected to the document processing device and the cloud server system via the network, wherein a trusted proxy app is installed on and executed by the document payment processing device,
wherein the document payment processing device provides a link program through the trusted proxy app, uploads a document to be printed out to the cloud server system, executes a mobile payment program according to a fee information provided by the cloud server system, and sends a document output command to the cloud server system upon completion of payment, allowing the cloud server system to send the document to be printed out to the document processing device for output.

Therefore, the users use the link program of the trusted proxy app of the document payment processing device to directly upload the document to be printed out to a remote end for fee calculation. The users perform mobile payment with the document payment processing device. Finally, the document payment processing device sends the document output command to the remote end and causes the remote end to send the document to be printed out to the document processing device for printing. Consequently, in this preferred embodiment, not only is personal information unlikely to be stolen or tampered with, but no complicated operating process flow is required. It is only when the users have made payment that a document is available to the users, so as to effectively manage fee collection, enhance security, enhance operation efficiency, and enhance payment management efficiency.

DETAILED DESCRIPTION OF THE INVENTION

To facilitate understanding of the object, characteristics and effects of this present disclosure, embodiments together with the attached drawings for the detailed description of the present disclosure are provided.

Figure 1:
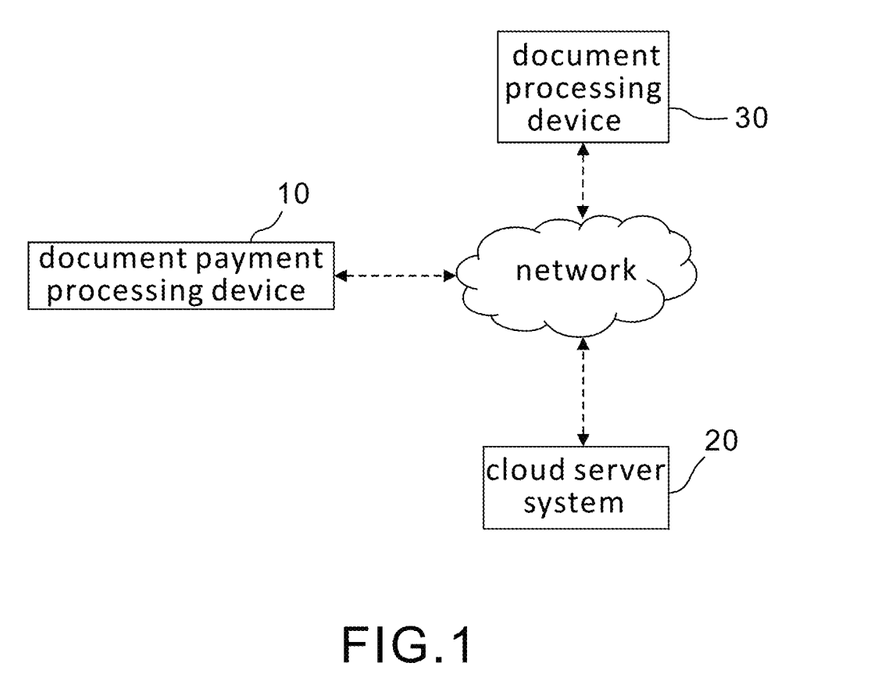
FIG. 1 is a block diagram of a secure and convenient document payment processing system according to a preferred embodiment of the present disclosure.
Figure 2:
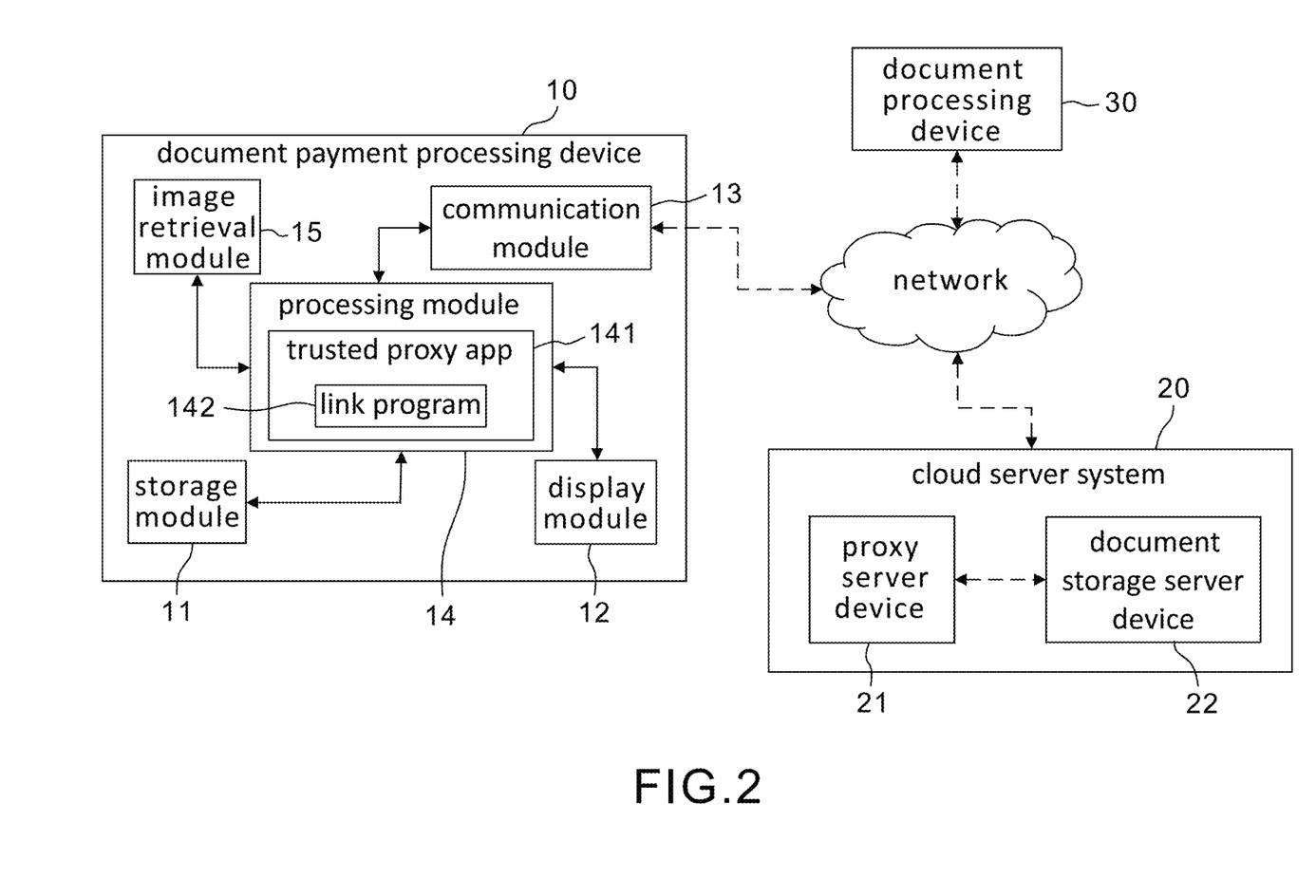
FIG. 2 is a block diagram of a secure and convenient document payment device of the secure and convenient document payment processing system according to a preferred embodiment of the present disclosure.

Referring to FIGS. 1, 2, a secure and convenient document payment processing system according to a preferred embodiment of the present disclosure comprises a user's document payment processing device 10, a cloud server system 20 located at a remote end, and a document processing device 30. The document payment processing device 10 is connected to the cloud server system 20 and the document processing device 30 via a network. The document payment processing device 10 comprises a storage module 11, a display module 12, a communication module 13 and a processing module 14. The processing module 14 is connected to the storage module 11, the display module 12 and the communication module 13.

In this embodiment, the document payment processing device 10 comprises a mobile device, a tablet or a wearable device.

In this embodiment, the document processing device 30 comprises a Multi Function Product/Printer/Peripheral (MFP).

Referring to FIGS. 1, 2, in this embodiment, the storage module 11 stores data/information received, data/information to be processed, data/information processed, and app-related data/information. The storage module 11 comprises a memory, including but not limited to Dynamic Random Access Memory (DRAM), Flash memory, High Disk Drive (HDD), and Solid-State Drive, Solid-State Disk (SSD).

Referring to FIGS. 1, 2, in this embodiment, the display module 12 is adapted to display related data/information and comprises a non-touch display module and a touch display module. Preferably, the display module 12 is adapted to display related data/information and comprises a touch display unit operated by a user's finger gestures (such as click, touch and slide).

Referring to FIGS. 1, 2, in this embodiment, the communication module 13 has a communication protocol whereby the communication module 13 is connected to the cloud server system 20 and the document processing device 30 via the network to exchange data/information. The communication module 13 comprises a wireless network module, including but not limited to Wi-Fi module or 2G, 3G, 4G, 5G or any communication modules of higher specifications.

Referring to FIGS. 1, 2, in this embodiment, the processing module 14 processes the data/information received and the data/information stored in the storage module 11. The processing module 14 comprises a central processing unit (CPU).

Referring to FIGS. 1, 2, in this embodiment, the cloud server system 20 comprises a proxy server device 21 and a document storage server device 22 connected to the proxy server device 21. The document storage server device 22 provides webpages having operating interfaces for uploading a document.

In this embodiment, the proxy server device 21 is provided at a first enterprise end.

The document storage server device 22 is provided at a second enterprise end. In a variant embodiment, the document storage server device 22 is provided at the first enterprise end, and the first enterprise end rents the document storage server device 22 to the second enterprise end.

Figure 3:
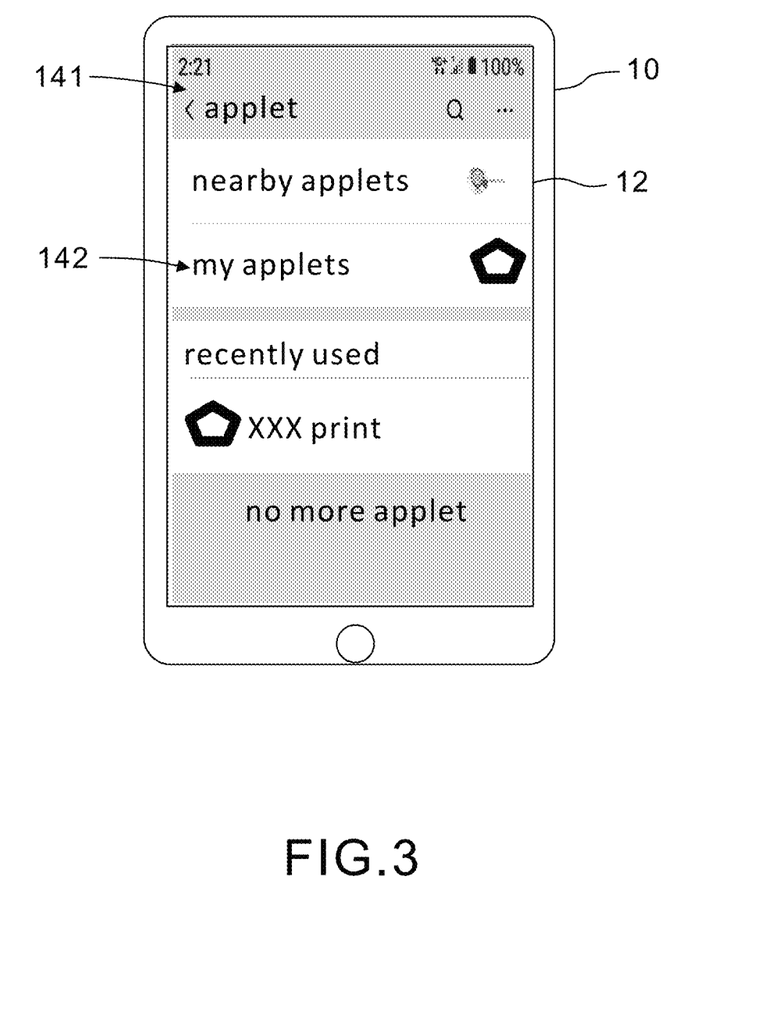
FIG. 3 is a schematic view of a trusted proxy app display link program according to a preferred embodiment of the present disclosure.

Referring to FIGS. 2, 3, a document to be printed out is stored in the document payment processing device 10, and users use the document processing device 30 to print out the document to be printed out. To this end, the users execute a link program 142 provided by a trusted proxy app 141 installed on the document payment processing device 10 to upload the document to be printed out to the cloud server system 20. Upon completion of payment, the cloud server system 20 sends the document to be printed out to the document processing device 30 for printing. To access the trusted proxy app 141, the users enter a user account information to effect related identity authentication in advance and simply.

In this embodiment, the trusted proxy app 141 is provided by the first enterprise end and characterized by security and trustworthiness. The trusted proxy app 141 comprises a trusted real-time communication app or a trusted payment app. The trusted real-time communication app is a real-time communication app, such as WeChat, LINE, Whatsapp and Facebook. The trusted payment app comprises a mobile payment program (for example, Taiwan Pay) or a banking payment program (for example, banking App).

In this embodiment, the link program 142 is an applet AP in the trusted proxy app and comprises a link information to link to a webpage provided by the document storage server device 22. The second enterprise end files an application with the first enterprise end. The first enterprise end undergoes secure authentication and related processing according to the application. Then, the link program 142 is attached to the trusted proxy app 141 and is accessible to the users, thereby dispensing the users with the hassle of downloading an additional program.

The document processing device 30 is provided by the second enterprise end and located at different places as needed so as to be easily accessed by the users.

Referring to FIGS. 2, 3, the trusted proxy app 141 is installed on and executed by the processing module 14. If the users have already installed the trusted proxy app 141 on the document payment processing device 10, and thus the trusted proxy app 141 can be executed at any time, thereby dispensing with the need to download the trusted proxy app 141 again.

Referring to FIGS. 2, 3, the users execute the trusted proxy app 141 with the display module 12 to display a link program frame and choose to execute the link program 142. The processing module 14 executes the link program 142. Via the network, the communication module 13 is connected to a webpage provided by the document storage server device 22.

Referring to FIGS. 2, 3, the users upload the document to be printed out with the display module 12, using the webpage. The document to be printed out, which is stored in the storage module 11, is uploaded by the processing module 14 to the document storage server device 22 via the communication module 13. The document storage server device 22 sends the document to be printed out to the proxy server device 21. Then, the proxy server device 21 performs fee computation on the document to be printed out, so as to generate a fee information.

Referring to FIGS. 2, 3, the users perform a mobile payment process with the document payment processing device 10 according to the fee information provided by the proxy server device 21, so as to complete the payment. The proxy server device 21 instructs the document storage server device 22 to send the document to be printed out to the document processing device 30 for printing.

Referring to FIGS. 2, 3, the processing module 14 executes a mobile payment process. Upon completion of payment, the processing module 14 sends a document output command to the proxy server device 21 via the communication module 13. Then, the proxy server device 21 sends the document output command to the document storage server device 22, such that the document storage server device 22 sends the document to be printed out to the document processing device 30 for printing.

The first way of payment is further described below. The processing module 14 executes the mobile payment process according to a first payment authentication information included in the fee information sent from the cloud server system 20 to the communication module 13, so as to complete the payment and enhance the ease of payment by effecting fee payment in advance without being limited in terms of places and positions.

The second way of payment is further described below. The document payment processing device 10 further comprises an image retrieval module 15 connected to the processing module 14. The proxy server device 21 sends the fee information to the document processing device 30. The users operate the document processing device 30 in such a way to enable the document processing device 30 to display a second payment authentication information according to the fee information. Alternatively, after receiving the fee information, the document processing device 30 displays the second payment authentication information. The users operate the display module 12 in such a way to cause the processing module 14 to not only instruct the image retrieval module 15 to fetch the second payment authentication information but also execute the mobile payment process according to the second payment authentication information, so as to complete the payment. Therefore, the document processing device 30 further confirms the related payment authentication information, fee information, and payment authentication information to enhance accuracy thereof.

Under the first and second ways of payment, the third way of payment is characterized by the following: the trusted payment app recognizes a payment account (for example, QR code) shown in the second payment authentication information; a payment credit line is entered to the document payment processing device 10; and the processing module 14 executes the mobile payment process, so as to complete the payment and enhance the ease of the users' paying fees.

In this embodiment, the image retrieval module 15 comprises a camera module for fetching the second fee payment information by photography.

In this embodiment, the first payment authentication information comprises a payment authentication code. The payment authentication code comprises an input character information.

In this embodiment, the second payment authentication information is a QR code or a barcode and comprises an input character information.

In this preferred embodiment, the document to be printed out is a text document, a picture document, or a document combining text and picture.

Figure 4:
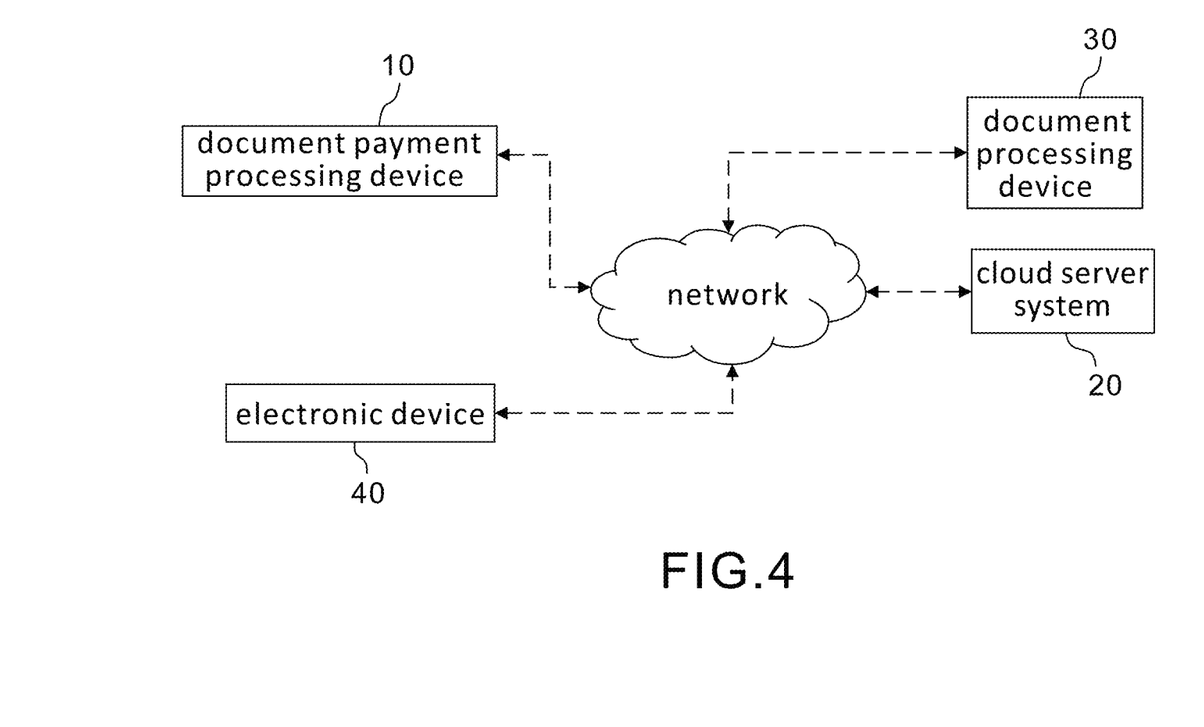
FIG. 4 is another block diagram of the secure and convenient document payment processing system according to a preferred embodiment of the present disclosure.

Referring to FIG. 4, in this preferred embodiment, the secure and convenient document payment processing system further comprises an electronic device 40. The electronic device 40 is connected to the document payment processing device 10, the cloud server system 20 at the remote end, and the document processing device 30 via the network.

The electronic device 40 is provided at the second enterprise end. The electronic device 40 is a laptop, a desktop, or a tablet.

At the second enterprise end, to insert the dedicated link program 142 into the trusted proxy app 141, it is necessary for the electronic device 40 to send an enterprise account information to the proxy server device 21 for a check. When the check passes, the electronic device 40 registers the proxy server device 21 and thus completes a related security check in advance. Checking the enterprise account information entails the following: performing a comparison process by the proxy server device 21 to determine whether identical enterprise account informations are stored; wherein the check passes, and the registry is allowed, upon determination that identical enterprise account informations are present; wherein the check fails, and the registry is disallowed, upon determination that no identical enterprise account informations are present.

After the electronic device 40 has registered the proxy server device 21, the electronic device 40 at the second enterprise end sends a link program setting information to the proxy server device 21. After receiving the link program setting information, the proxy server device 21 creates a connection to the document storage server device 22, performs a program setting process according to the link program setting information, and inserts the link program 142 into the trusted proxy app 141.

In this embodiment, user identity is checked first to confirm identity authorization, and the program setting processing is carried out in a customized way according to the link program setting information. The link program 142 to be displayed in the trusted proxy app 141 is configured according to the demand for the link program 142 at the second enterprise end. Upon completion of the configuration, the link program 142 is disposed in the trusted proxy app 141 by way of additional functionality; thus, not only is security enhanced, but both usage flexibility and customer loyalty can also be enhanced by allowing the other manufacturers to provide customized additional functions in the trusted proxy app 141.

In addition, the proxy server device 21 sends a program update information to the document payment processing device 10 by server push to update the trusted proxy app 141 and thus update the link program 142. The update includes any other new link programs created and the updated related information of original link programs.

Therefore, the users use the link program 142 of the trusted proxy app 141 of the document payment processing device 10 to directly upload the document to be printed out to the cloud server system 20 so as to perform fee calculation. The users perform mobile payment with the document payment processing device 10. Finally, the users use the document payment processing device 10 to cause the cloud server system 20 to send the document to be printed out to the document processing device 30 for printing. Consequently, in this preferred embodiment, not only is personal information unlikely to be stolen or tampered with, but no complicated operating process flow is required. It is only when the users have made payment that a document is available to the users, so as to effectively manage fee collection, enhance security, enhance operation efficiency, and enhance payment management efficiency.

While the present disclosure has been described by means of specific embodiments, numerous modifications and variations could be made thereto by those skilled in the art without departing from the scope and spirit of the present disclosure set forth in the claims.

What is claimed is:

1. A secure and convenient document payment processing system, comprising:
    a document processing device for outputting a document;
    an electronic device connected to a proxy server device of a cloud servo system via a network, comprising an electronic device processor and electronic device memory storing computer executable instructions that, when executed by the electronic device processor, cause the electronic device processor to:
    send enterprise account information to the proxy server device;
    in response to determining that identical enterprise account information is stored at the proxy server device, register the proxy server device; and
    send a link program setting information to the proxy server device;
    the cloud servo system located at a remote end and connected to the document processing device via a network, the cloud servo system further comprising a document storage server device and the proxy server device comprising a proxy server device processor and a proxy server device memory storing computer executable instructions that, when executed by the proxy server device processor, cause the proxy server device processor to:
    receive, from the electronic device, the enterprise account information;
    determine whether identical enterprise account information is stored;
    receive, from the electronic device, the link program setting information;
    create a connection to the document storage server device;
    configure a link program according to the link program setting information;
    in response to configure the link program, embed the link program to a trusted proxy app;
    receive a document to be printed out from a document payment processing device;
    send fee information to the document payment processing device;
    receive a document output command from the document payment processing device; and
    send the document output command to the document processing device for outputting the document; and
    the document payment processing device connected to the document processing device and the cloud servo system via the network, comprising a document payment processing device processor and a document payment processing device memory storing computer executable instructions that, when executed by the document payment processing device processor, causes the document payment processing device processor to:
    authenticate a user identity;
    in response to authenticating the user identity, install and execute the trusted proxy app;
    in response to executing the trusted proxy app, access a webpage provided by the remote end through the link program;
    upload the document to be printed out to the document storage server through the webpage;
    execute a mobile payment program according to fee information received from the proxy server device; and
    send the document output command to the proxy server device upon completion of payment.

2. The secure and convenient document payment processing system of claim 1, wherein the document payment processing device executes the mobile payment program according to a first payment authentication information included in the fee information, so as to complete the payment.

3. The secure and convenient document payment processing system of claim 1, wherein the document processing device receives the fee information from the cloud servo system and displays a second payment authentication information according to the fee information, such that the document payment processing device executes the mobile payment program according to the second payment authentication information, so as to complete the payment.

4. The secure and convenient document payment processing system of claim 1, wherein the proxy server device generates the fee information according to the to-print document received by and stored in the document storage server device.

5. The secure and convenient document payment processing system of claim 1, the document payment processing device further comprising:
    a storage module for storing a document to be printed out;
    a display module for displaying the document to be printed out or related data; and
    a communication module connected to the remote end and the document processing device via the network to do a data exchange.

6. The secure and convenient document payment processing system of claim 5, wherein the document payment processing device processor executes the mobile payment program according to a first payment authentication information in the fee information, so as to complete the payment.

7. The secure and convenient document payment processing system of claim 5, the document payment processing device further comprising an image retrieval module connected to the document payment processing device processor, wherein the document payment processing device processor accesses the document processing device through the image retrieval module and executes the mobile payment program according to a second payment authentication information displayed in the fee information sent from the remote end, so as to complete the payment.

8. The secure and convenient document payment processing system of claim 5, wherein the trusted proxy app comprises a trusted real-time communication app or a trusted payment app.

9. The secure and convenient document payment processing system of claim 8, wherein the display module comprises a non-touch display module and a touch display module.

10. The secure and convenient document payment processing system of claim 8, wherein the trusted real-time communication app is WeChat, LINE, WhatsApp or Facebook.

11. The secure and convenient document payment processing system of claim 8, wherein the trusted payment app comprises the mobile payment program or a banking payment program.

12. The secure and convenient document payment processing system of claim 5, wherein the display module comprises a touch display unit.

* * * * *